US000001854H

United States Statutory Invention Registration [19]

[11] Reg. Number: H1,854

Boston et al. [45] Published: Jul. 4, 2000

[54] INDUCTIVE SPOOL DISPLACEMENT SENSOR

[75] Inventors: Timothy A. Boston, Tremont; Bruce E. Unger, Peoria, both of Ill.

[73] Assignee: Caterpillar Inc., Peoria, Ill.

[21] Appl. No.: 09/221,402

[22] Filed: Dec. 28, 1998

[51] Int. Cl.[7] ..... G01B 7/14

[52] U.S. Cl. ..... 324/207.15

[56] References Cited

U.S. PATENT DOCUMENTS

| | | | |
|---|---|---|---|
| 5,244,002 | 9/1993 | Frederick | 137/1 |
| 5,502,378 | 3/1996 | Atteberry et al. | 324/204 |
| 5,518,015 | 5/1996 | Berget et al. | 137/1 |
| 5,711,507 | 1/1998 | Berget et al. | 251/129.04 |

*Primary Examiner*—Daniel T. Pihulic
*Attorney, Agent, or Firm*—Samuel Digirolamo

[57] ABSTRACT

An inductive spool displacement sensor for determining the position or displacement of a spool within a particular hydraulic valve including a sensor housing having a cavity formed therein adapted for mounting within the hydraulic valve, the sensor housing being positioned such that at least a portion of the valve spool is disposed to enter the sensor cavity during certain operations of the valve. The sensor further includes a sensing coil wound about the housing cavity and a reference coil wound about the housing and spaced from the sensing coil, the inductance of the sensing coil being responsive to movement of the spool within the cavity and the inductance of the reference coil being responsive to the temperature of the fluid passing through the hydraulic valve. Based upon eddy current principles and because eddy currents are a function of material conductivity, the sensing coil, when energized, generates a signal indicative of that portion of the spool present within the housing cavity. Electronic circuitry, including a microprocessor, are coupled to the coils for receiving signals therefrom, the microprocessor determining the position of the spool relative to the cavity, or some other predetermined reference point, and outputting a signal proportional to the position or displacement of the spool within the hydraulic valve. The reference coil is provided to compensate for changing inductance values due to changing fluid temperature.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INDUCTIVE SPOOL DISPLACEMENT SENSOR

DESCRIPTION

1. Technical Field

This invention relates generally to displacement sensors for determining the position of a spool in a hydraulic valve and, more particularly, to an inductive displacement sensor positioned in close proximity to the spool of a hydraulic valve for detecting and measuring the axial displacement of the spool in the valve.

2. Background Art

In hydraulic control systems, flow control valves used to control fluid flow in a hydraulic circuit typically utilize some type of positioning means to detect the position of the valve spool so that the flow of fluid through the valve can be monitored for a wide variety of different reasons. The valve spool which is movable within the hydraulic controls the flow of fluid through the valve to the appropriate components connected thereto. In order to control and ensure accurate output from the valve, it is necessary to know and accurately control the position of the spool in order to achieve the desired output to a particular component. Precise control of the output of the hydraulic valve increases the overall operating efficiency of the hydraulic system. A reliable spool positioning indicator also enhances the accuracy and dependability of the hydraulic system.

Some prior art devices for monitoring the position of the spool in a hydraulic valve include use of linear variable differential transformers (LVDT) which convert the mechanical output position of the spool into an electrical output signal. Other methods use pneumatically controlled valves that are usually actuated by a variable signal pressure of between 3–15 pounds per square inch (psig). These systems usually require precise calibration between the valve position and the corresponding signal outputs for both the full open position and the full closed position of the valve. They are also subject to errors and inefficiencies due to various temperature changes in the system and such systems are usually costly to manufacture.

Hall effect sensors have also been used to detect the displacement of the spool. See U.S. Pat. No. 5,244,002. All Hall effect sensors utilize a magnet of some type so that the magnetic field of the magnet will intersect the Hall effect transducer to produce a signal proportional to the displacement of the spool within the valve. Although Hall effect sensors have proven satisfactory for certain applications, such constructions are again extremely sensitive to inaccuracies caused by spurious influences such as changes in fluid temperature, vibration and the like, and such systems are likewise expensive to manufacture since their construction must be very accurate and precise. Still further, the magnets associated with a Hall effect sensor tend to attract particles within the valve and sufficient accumulation of such particles may jam up the spool and/or detrimentally effect its overall operation.

It is therefore desirable to provide a spool position or displacement sensor that will output an accurate and reliable indication of the spool position within a hydraulic valve; that will be less costly to manufacture and maintain; and that will be simpler in overall design and less sensitive to the normal operating conditions of the valve. It is also desirable to provide a spool position or displacement sensor that does not utilize a magnet for sensing the position and/or location of the spool within the valve.

Accordingly, the present invention is directed to overcoming one or more of the problems as set forth above.

DISCLOSURE OF THE INVENTION

In one aspect of the present invention, a sensor for monitoring the position of a spool within a hydraulic valve is generally comprised of a sensor housing having a sensing coil and a reference coil wound about a cup or cavity formed within the housing. The sensor is positioned such that the valve spool is disposed to enter the sensor housing cavity containing the two coils. The induction of the sensing coil is responsive to the position of the spool within the sensor housing cavity whereas the induction of the reference coil is responsive to the temperature of the fluid medium within the hydraulic valve. The reference coil is spaced from the sensing coil and its induction is likewise independent of the spool position within the housing cavity. Electronic circuitry coupled to or with the two coils produces a control signal representative of the position or axial displacement of the spool within the hydraulic valve.

BRIEF DESCRIPTION OF THE DRAWINGS

For a better understanding of the present invention, reference may be made to the accompanying drawings in which.

BEST MODE FOR CARRYING OUT THE INVENTION

Figure 1:
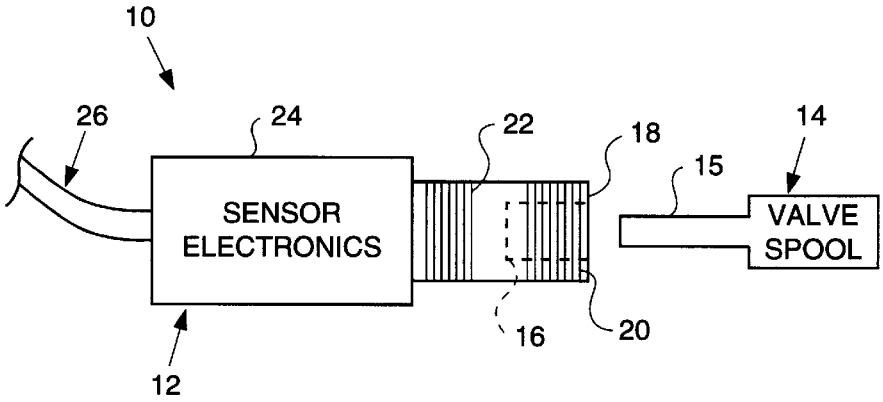
FIG. 1 is a side elevational view of a spool displacement sensor incorporating the principles of the present invention, the valve spool of a typical hydraulic valve being shown in operative position for use with the present sensor.

Referring to FIG. 1, there is shown a spool positioning or displacement sensor 10 that incorporates the principles of the present invention. The sensor 10 is generally comprised of a housing 12 that is mounted within the hydraulic valve in close proximity to the nose 15 of a hydraulic spool 14. Depending upon the particular valve construction, the housing 12 may be modified and adapted for easy mounting within the valve body such that one end portion of the spool 14 is disposed for movement into and out of a cup or cavity 16 formed within the sensor housing 12. The sensor housing 12 is positioned and located such that upon operation of the particular hydraulic valve, the end portion 15 of spool 14 will move into and out of the cavity 16 as will be hereinafter further explained.

The hydraulic spool 14 is generally made of a metallic material or some other similarly conductive material. The hydraulic spool 14, upon operation of the hydraulic valve (not shown), is disposed to enter the sensor housing 12 at the opening 18 and thereafter enter the cavity 16. Wound about the sensor housing 12 encircling the cavity 16 is a sensing coil 20. The coil 20 is generally wound in the form of a helix about the proximity of the cavity 16 and the inductance of coil 20 is responsive to the position or displacement of the spool end portion 15 within the cavity 16. The inductance measurements made by the sensing coil 20 are correlated by a microprocessor or other similar means so as to be indicative of the position or displacement of the spool 14 within a particular hydraulic valve.

Though the inductance of the sensing coil 20 is relatively constant in the absence of the spool nose 15 within the cavity 16, the inductance of coil 20 can change due to changes in the temperature of the fluid within the valve. A second coil or reference coil 22 is therefore provided to compensate for the changing temperature of the valve fluid. The reference coil 22 is spaced from coil 20 as shown in FIG. 1 and is arranged such that only fluid temperature affects its inductance, and such inductance is not affected by the position of the spool end 15 within the cavity 16. The reference coil 22 is likewise wound in the form of a helix and its inductance is used to establish a base line for determining the presence of the spool end 15 within the cavity 16.

The sensor 10 further includes sensing electronics 24, including a microprocessor 36, which are coupled to the coils 20 and 22 for determining the position or displacement of the spool 14 within the sensor cavity 16, all of which components are incorporated or otherwise mounted within the housing 12 in a conventional manner. Power to the sensor 10 is provided in a conventional manner via input and output wiring 26.

Figure 2:
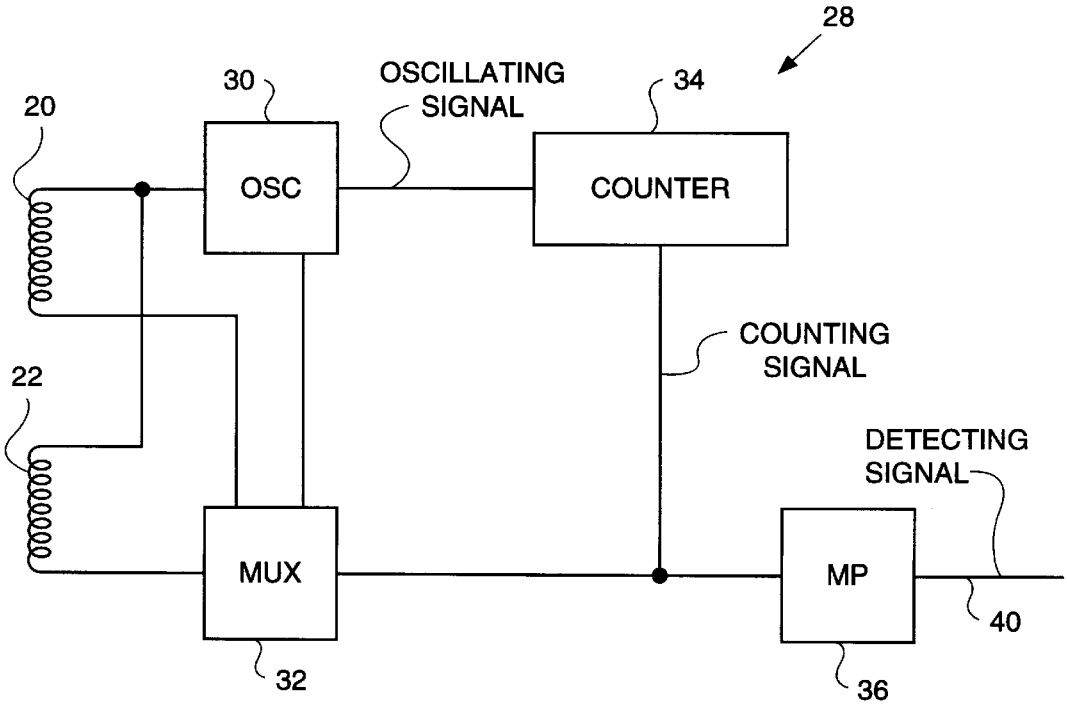
FIG. 2 is a block diagram of the electrical circuitry associated with the spool displacement sensor shown in FIG. 1.

Referring now to FIG. 2, there is shown a block diagram of one embodiment of the control circuitry 28 which may comprise the sensing electronics 24 of the present sensor 10. The sensing circuit 28 is comprised of an oscillator 30 provided to energize both the sensing coil 20 and the reference coil 22. The oscillator 30 includes a timer that energizes the coils with an oscillating waveform. A multiplexer 32 is provided to allow only one coil to energize at a given time. Consequently, the frequency of the oscillating waveform will be directly related to the inductance of the coil energized. A counter 34 is provided to tally the number of pulses associated with the oscillating waveform. For example, the oscillator 30 will energize one coil, while the counter 34 tallies the number of pulses of the oscillating waveform associated with the one coil. Once the number of pulses reaches a predetermined number, the counter 34 will reset. Responsively, the multiplexer 32 will cause the other coil to energize. Meanwhile, the counter 34 tallies the numbers of pulses of the oscillating wave associated with the other coil.

The counter 34 additionally produces a counting signal. The counting signal may be a continuous pulse width modulated (PWM) signal wherein the duration of the high pulse level is responsive to one coil being energized, for example, the sensing coil 20, while the low pulse level is responsive to the other coil being energized, for example, the reference coil 22. The counting signal is delivered to the microprocessor 36 which produces a detecting signal 40 having a duty cycle that is responsive to the duty cycle of the counting signal in order to provide greater resolution. For example, a counting signal having a duty cycle of 50% may correspond to the microprocessor producing a detecting signal having a duty cycle of 5%, which is indicative of no portion of the spool nose 15 being present within the cavity 16. Meanwhile a counting signal having a duty cycle of 55% may correspond to a detecting signal having a duty cycle of 95%, which is indicative of a substantial portion of the spool nose 15 being present within the cavity 16. It is recognized that other types of signals may likewise be used for the counting signal and the microprocessor 36 can be adapted to receive such different types of signals and produce a detecting signal in response thereto.

When the spool end 15 enters the cavity 16, the energized coil 20, in accordance with well known theory, introduces eddy currents in the metallic spool. In this regard, at least the spool nose 15 must be fabricated from a metallic or other conductive material. The eddy currents are a function, among other properties, of material conductivity. Thus, when the spool nose enters the cavity 16, eddy currents in the spool cause the effective inductance of the sensing coil 20 to decrease. Consequently, the oscillator 30 will produce the oscillating waveform with an increased frequency. Because eddy currents are a function of material conductivity, the greater the portion of the spool that enters the cavity, the greater the change in the oscillating waveform frequency. In other words, the change in the frequency of the oscillating waveform is due to the eddy current inductive effects on the metallic spool member.

For example, when no portion of spool end 15 exists within the cavity 16, the inductance of each coil 20 and 22 remains the same. Consequently, the oscillating waveform associated with each coil is produced with the same frequency, which causes a counting signal to be produced with a 50% duty cycle (the duration of the "high" and "low" pulse levels are the same). However, when the spool end 15 begins to move into the cavity 16, the inductance associated with the sensing coil 20 increases proportionally, which causes the frequency of the associated oscillating signal to decrease. Resultingly, the duration of the "high" pulse level of the counting signal will increase in magnitude because it takes longer to count to the predetermined number of pulses due to the lower frequency. Thus, the duty cycle of the counting signal increases proportional to the increasing inductance associated with the sensing coil 20, which inductance is indicative of at least a portion of the spool nose 15 being present within the cavity 16.

It is recognized that the circuit 28 shown in FIG. 2 is exemplary, and the manner of design and construction of this circuit, or a similar circuit, would be commonly known to a person skilled in the art.

In operation, the sensor 10 first energizes the reference coil 22 to determine the temperature of the fluid medium within the hydraulic valve to establish a baseline for the detection of the spool 14. Once this baseline is established, sensing coil 20 is energized by the multiplexer 32 and a measurement of the coil inductance is taken. This measurement will be transmitted by sensor 10 in the form of the detecting signal 40 generated by circuit 28 and such signal will be indicative of the position or displacement of the spool 14 relative to the cavity 16, or some other predetermined reference point, and a correlation can be established between the output of the sensor 10 and the displacement of the spool 14 within any particular hydraulic valve. In other words, as the spool 14 moves to the left into the sensor cavity 16 as illustrated in FIG. 1, the output of the sensor 10 will be proportional to how much of the spool nose 15 is located within the cavity 16. Since the present invention compensates for changing inductance due to changing fluid temperature, the inductance values of each coil 20 and 22 are indirectly compared to each other, and since the inductance values of both coils 20 and 22 change in response to temperature, the present sensor configuration is able to distinguish between the changing inductance values due to temperature and those inductance valves that are attributable to the spool nose 15 being present within the cavity 16. The microprocessor 36 then calculates the exact position or displacement of the spool 14 relative to some predetermined location and outputs such information via output signal 40.

Depending upon the particular relevance of the spool displacement being monitored by the present sensor 10, the detecting signal 40 outputted by sensor 10 could be coupled in some fashion to an electronic control monitoring system or some other type of warning system for trend and/or system or component analysis. For example, if the present sensor 10 is used in association with a filter by-pass valve used in a particular work machine wherein displacement of the spool in the by-pass valve is representative of the main oil filter being clogged or otherwise restricted, a warning signal may be provided in response to the detecting signal 40 having a duty cycle greater than a predetermined value which will activate some type of visual and/or audio warning signal in the operator compartment of the work machine. The monitoring system may also be some type of remote CPU that stores trend and historical data on the maintenance of the machine. Still further, this trend data may be stored and accessed by a service tool of a type well known in the art for downloading diagnostic and prognostic information. The detecting signal 40 may likewise be correlated so as to be indicative of the fluid flow through the particular hydraulic valve.

INDUSTRIAL APPLICABILITY

As described herein, the present sensor 10 has particular utility in any hydraulic valve wherein the position or displacement of the spool within such valve must be monitored for a particular reason.

For example, the present sensor 10 is particularly adaptable for use in a spool actuated by-pass valve commonly used on work machines of various types wherein movement of the by-pass spool is indicative of the fact that the oil filter associated with a particular work machine is becoming clogged or otherwise restricted. Filter by-pass valves are used in a wide variety of different types of work machines such as a wide variety of construction and mining equipment including large earthmoving machines, off-highway trucks, wheel loaders, scrapers, and other similar type machines and equipment. In addition, such applications include both stationary as well as mobile devices and/or systems. In this particular application, the present sensor 10 in association with a spool actuated by-pass valve can be used to monitor the condition of the oil filter and to provide the necessary warning to the operator when the oil filter becomes clogged or otherwise restricted. For example, as the by-pass spool moves into the cavity 16, the sensor output will be proportional to the amount of the spool nose 15 present within the cavity 16. Upon reaching a predetermined position or location within the cavity 16, the detecting signal 40 outputted from sensor 10 to an electronic monitoring system or some other type of warning system can be used to trigger a warning signal to the operator compartment of the work machine indicative of the oil filter being clogged or otherwise restricted so that action can be taken to correct the situation before damage occurs.

In another application, the spool 14 could be associated with a main relief valve and the present sensor 10 could be utilized in association with such valve to monitor the fluid fill of a clutch mechanism associated with the transmission system of a particular work machine such as an articulated dump truck. By monitoring the fluid flow through the main relief valve, which flow is indicative of the movement and displacement of the spool valve within the main relief valve, fluid flow to the clutch mechanism as well as termination of such flow can be determined. Other applications are likewise recognized and anticipated.

Regardless of the specific application, the sensor 10 outputs a detecting signal 40 which is indicative of the spool position or displacement thereof within a particular hydraulic valve and such signal can be utilized to monitor the spool position; to control the pressure or flow through the particular valve; and/or to trigger a warning signal to the operator of the work machine, or other device, indicative of a particular sensed condition or malfunction. The PWM outputted signal 40 can be scaled up to a useable range for use with an electronic control monitoring system, or any other system associated with a particular work machine, device or other operating system.

Other aspects, objects and advantages of the present invention can be obtained from a study of the drawings, the disclosure and the appended claims.

What is claimed is:

1. A sensor for determining the position of a displaceable spool located within a hydraulic valve, said sensor comprising:

(a) a housing having a cavity formed therein for receiving at least a portion of the spool of the hydraulic valve;

(b) a sensing coil wound about said housing cavity and disposed to generate electrical signals responsive to movement of the valve spool within said cavity, said electrical signals being representative of that portion of the spool located within the cavity in response to the change of the inductance of said sensing coil due to the position of the spool within the cavity;

(c) a reference coil wound about said housing and disposed to generate electrical signals responsive to the temperature of the valve fluid within the cavity, said electrical signals being independent of the position of the spool within said cavity; and (d) circuit means coupled with the sensing coil and the reference coil for producing an output signal proportional to the axial displacement of the spool relative to said cavity.

2. The sensor, as set forth in claim 1, wherein said circuit means includes an oscillator selectively coupled with the sensing coil and the reference coil for producing an oscillating waveform, wherein the frequency of the oscillating waveform is a function of the induction of one of said coils.

3. The sensor, as set forth in claim 2, wherein said circuit means includes a multiplexer adapted to select one coil to energize at a given time.

4. The sensor, as set forth in claim 3, wherein said oscillator produces an oscillating waveform having a series of pulses, the frequency of which is a function of the one energized coil inductance.

5. The sensor, as set forth in claim 1, wherein said output signal is a signal having a pulse width modulated waveform indicative of that portion of the spool located within said cavity.

6. The sensor, as set forth in claim 1, wherein the spool is made of an electrically conducting material.

7. A spool displacement sensor for determining the axial displacement of a spool located within a hydraulic valve, said sensor comprising:

(a) a housing having a cavity formed therein for receiving at least a portion of the valve spool;

(b) a first coil wound about said housing cavity and disposed to generate electrical signals responsive to the position of the spool within said cavity, said electrical signals being representative of that portion of the spool within the cavity in response to the change of the inductance of said first coil due to movement of the spool within the cavity;

(c) a second coil wound about said housing and disposed to generate electrical signals responsive to the temperature of the fluid medium flowing through the hydraulic valve and within said cavity, said electrical signals being independent of the position of the spool within said cavity; and (d) a microprocessor coupled with the first and second coils and adapted to receive the electrical signals from said first and second coils, said microprocessor determining the axial displacement of the spool relative to a predetermined location within the hydraulic valve.

8. The sensor, as set forth in claim 7, wherein said microprocessor produces a detecting signal having a pulse width modulated waveform indicative of the axial movement of the spool relative to said predetermined location.

9. In a hydraulic valve having a body portion with an axially displaceable spool element located therewithin, and means for selectively positioning the spool element in the valve body, the improvement comprising an apparatus for determining the axial displacement of the spool element relative to the valve body, said apparatus comprising:

(a) a housing having a cavity formed therein for receiving one end portion of the spool element;

(b) a sensing coil disposed adjacent said cavity wherein the induction of the sensing coil is responsive to movement of the spool element within said cavity;

(c) a reference coil disposed adjacent said cavity wherein the inductance of said reference coil is responsive to the temperature of the fluid within the hydraulic valve and wherein said induction is independent of the position of the spool element within said cavity; and (d) circuitry coupled to said coils for producing an output signal proportional to the axial displacement of the spool element relative to the valve body.

* * * * *